United States Patent [19]

Iida et al.

[11] Patent Number: 5,520,092
[45] Date of Patent: May 28, 1996

[54] PISTON OF SHOCK ABSORBER

[75] Inventors: Masatake Iida; Teruhito Ohkouchi, both of Toyota, Japan

[73] Assignee: Taiho Kogyo Co., Ltd., Toyota, Japan

[21] Appl. No.: 360,675

[22] PCT Filed: Apr. 28, 1994

[86] PCT No.: PCT/JP94/00716

§ 371 Date: Dec. 19, 1994

§ 102(e) Date: Dec. 19, 1994

[30] Foreign Application Priority Data

Apr. 30, 1993 [JP] Japan .................... 5-128186

[51] Int. Cl.⁶ .................................................. F16J 9/00
[52] U.S. Cl. ...................... 92/240; 92/249; 92/155
[58] Field of Search ................... 92/240, 248, 249, 92/250, 155, 245

[56] References Cited

U.S. PATENT DOCUMENTS

| 3,212,411 | 10/1965 | Storms . | |
| 3,842,717 | 10/1974 | Prescott | 92/250 |
| 4,539,895 | 9/1985 | Tanaka et al. | 92/249 |
| 4,676,143 | 6/1987 | Nomura et al. | 92/249 |

FOREIGN PATENT DOCUMENTS

| 2449582 | 10/1974 | Germany | 92/248 |
| 61-82072 | 4/1986 | Japan . | |
| 61-116138 | 6/1986 | Japan . | |
| 2-25743 | 2/1990 | Japan . | |
| 2-66332 | 3/1990 | Japan . | |

*Primary Examiner*—Edward K. Look
*Attorney, Agent, or Firm*—Flynn, Thiel, Boutell & Tanis

[57] ABSTRACT

A piston for a shock absorber as may be used in an automobile comprises a piston body, and a piston ring which covers the outer periphery thereof. One end of the piston ring is formed as a bend, which is received in a first receiving groove formed in the piston body. The first receiving groove comprises opposing end faces which extend in a direction orthogonal to the axis of the piston body, and a bottom surface which connects together the both end faces. The tip of the bend is disposed in abutment against the corner defined by one of the end faces and the bottom surface. As compared with the prior arrangement in which the end face comprising the corner is formed as a tapered surface, the tip of the bend is less likely to be displaced radially outward, thus reducing the possibility that he bend may be disengaged from he first receiving groove.

10 Claims, 2 Drawing Sheets

PISTON OF SHOCK ABSORBER

FIELD OF THE INVENTION

The invention relates to a piston of a shock absorber as may be used in an automobile, for example.

BACKGROUND OF THE PRIOR ART

A piston of a shock absorber as used in an automobile or the like in the art is constructed in the following manner: Specifically, a piston of a shock absorber is known (see Japanese Laid-Open Patent Application No. 82,072/1986, for example) which comprises a cylindrical piston body, and a piston ring formed of a resin and covering the outer peripheral surface of the piston body. At a given axial location or locations, the outer periphery of the piston body is formed with an engaging groove or grooves, which are engaged by an annular projection or projections formed around the inner periphery of the piston ring while the outer periphery of the piston body is formed with a receiving groove toward its one end, in which a bend formed on one end of the piston ring is received. A piston having such a covering over the outer peripheral surface thereof and a method of manufacturing same are also known (see, for example, U.S. Pat. No. 3,212,411).

However, in the piston disclosed in the former, both end faces which define the receiving groove are tapered surfaces, and the bend is disposed in alignment with a first end face while the tip of the bend is disposed in a corner which is formed by a second end face and the bottom surface. Accordingly, with such a conventional arrangement, there is a disadvantage that because the second end face is a tapered surface, the tip of the bend tends to be disengaged from the receiving groove along the tapered surface.

SUMMARY OF THE INVENTION

In view of the foregoing, in a piston for a shock absorber as mentioned above, in accordance with the invention, the receiving groove comprises a first end face which is located nearest the engaging groove, a second end face disposed in opposing relationship with the first end face and extending in a direction orthogonal to the axis of the piston body, and a bottom surface which connects the first and the second end face together. The tip of the bend of the piston ring is disposed in abutment against a corner defined by the second end face and the bottom surface, thus receiving the bend of the piston ring in the receiving groove.

With this construction, the tip of the bend abuts against the corner, and since the second end face which defines the corner extends in a direction orthogonal to the axis of the piston body, the tip of the bend is not likely to move radially outward from its position within the corner.

Accordingly, as compared with the prior art in which the send end face comprises a tapered surface, a disengagement of the bend from the receiving groove is not likely to occur.

DETAILED DESCRIPTION

Figure 1:
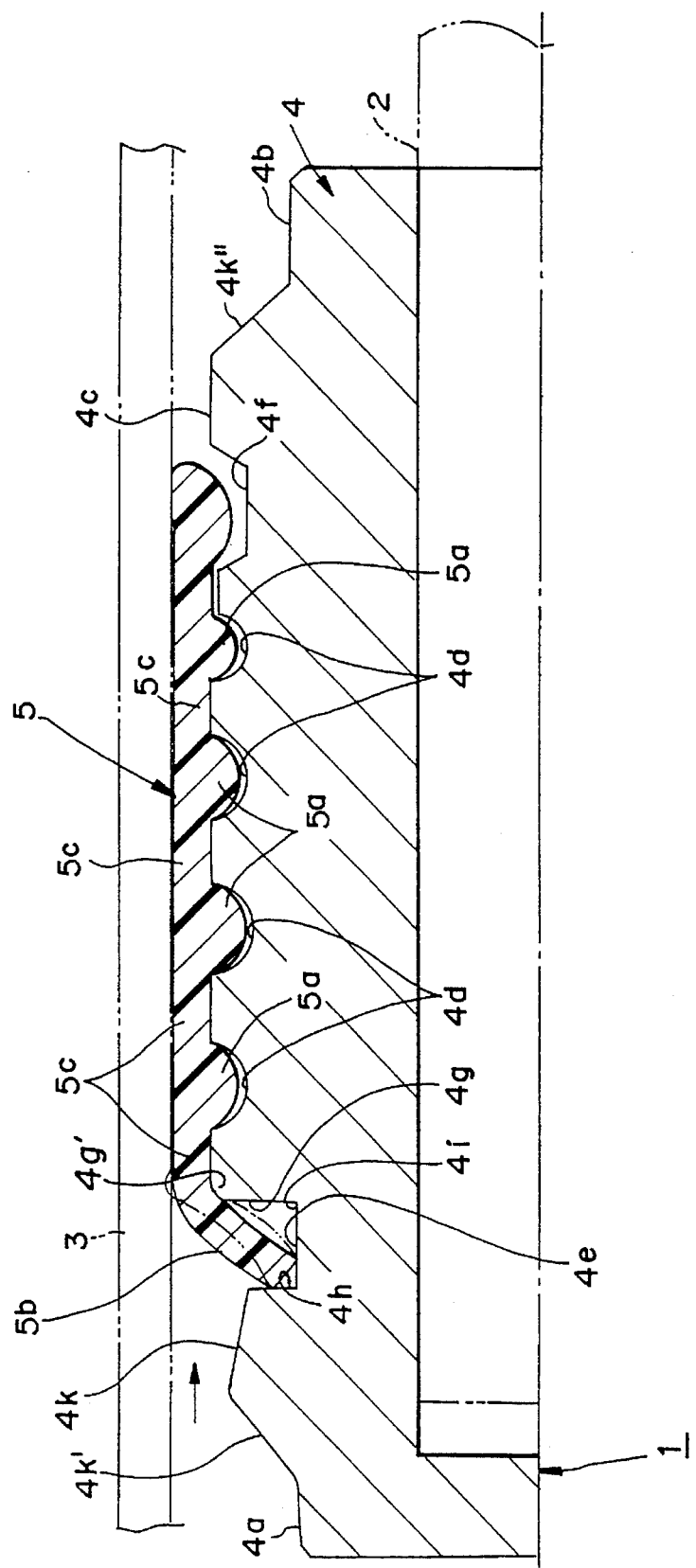
FIG. 1 is a cross section of one embodiment of the invention as located above a centerline.

The invention will now be described with reference to an embodiment shown in the drawings. In FIG. 1, 1 represents a piston for a shock absorber of an automobile, which is connected to an end of a rod 2 for reciprocating movement within a cylinder 3.

The piston 1 comprises a cylindrical piston body 4, and a piston ring 5 which is formed of tetrafluoride resin and covering the outer periphery of the piston body 4. The tetrafluoride resin may contain an additive, for example, 10–20 wt % of graphite and/or carbon.

In its axially median region, the outer periphery of the piston body 4 has a greater diameter portion 4c having a greater diameter than its opposite ends 4a, 4b. Annular grooves having an equal depth and width are formed in the greater diameter portion 4c at an equal axial spacing, and are used as engaging grooves 4d. On the other hand, a plurality of annular projections 5a are formed around the inner periphery of the piston ring 5 in registry with the locations of the respective engaging grooves 4d, and these annular projections 5a are engaged with the respective engaging grooves 4d. In this manner, an axial movement of the piston ring 5, which covers the piston body 4, relative to the piston body 4 is prevented.

At the axially left end, the greater diameter portion 4c is formed with a first receiving groove 4e having a depth greater than the depth of the engaging grooves for receiving a bend or bend portion 5b formed at one end of the piston ring 5 therein. At the axially right end, the greater diameter portion 4c is formed with a second receiving groove 4f having the same depth as the engaging grooves 4d, but having a width greater than the width of the engaging grooves, the second receiving groove 4f receiving the inner peripheral portion at the other end of the piston ring 5.

With this arrangement, the piston ring 5 is integrally mounted around the outer periphery of the piston body 5, covering substantially the entire region of the greater diameter portion 4c.

In the present embodiment, the first receiving groove 4e comprises a first end face 4g which is located adjacent to the engaging groove 4d (which is located to the right thereof) and extending in a direction orthogonal to the axis of the piston body 4, a second end face 4h which opposes the first end face 4g and extending in a direction orthogonal to the axis of the piston body 4, and a bottom surface 4i which connects the both end faces 4g, 4h together. The radial size of the first end face 4g and the axial size of the bottom surface 4i, or the depth and the width of the first receiving groove 4e are chosen to be substantially equal to each other.

When disposing the bend 5b so as to be contained within the first receiving groove 4e thus constructed the tip of the bend 5b is disposed in abutment against a corner defined by the second end face 4h and the bottom surface 4i. The bend 5b is received within the first receiving groove 4e under this condition. As a result, the bend 5b is inclined substantially at an angle of 45° with respect to the axis of the piston body 4, and an annular space is formed by the inner peripheral surface of the bend 5b, the bottom surface 4i and the first end face 4g. In addition, in the present embodiment, the thickness of the bend 5b is chosen to be slightly greater than that of a connection 5c which connects adjacent annular projections 5a together.

The outer peripheral edge of the first end face 4g, or a contact region 4g' which is in contact with the location of the bend 5b which represents a start point for folding the bend 5b, is chamfered so as to be arcuate in cross section, thus preventing any damage being caused to the start point of the bend 5b which comes into contact with such region. The contact region 4g' is arcuately chamfered to a radius of 0.5 mm, but such radius may be less.

The outer periphery of the end 4a which continues from the outer peripheral edge of the second end face 4h is formed as a first tapered surface 4k which is gently tapered so as to increase its diameter toward the left, and the portion of the end 4a which continues from the first tapered surface 4k to the left thereof is formed as a second tapered surface 4k' which is oppositely tapered so as to reduce its diameter toward the left.

It is also to be noted that the right end 4b continues to a tapered surface 4k" which reduces its diameter toward the right at the same angle of inclination as that of the second tapered surface 4k'.

Figure 2:
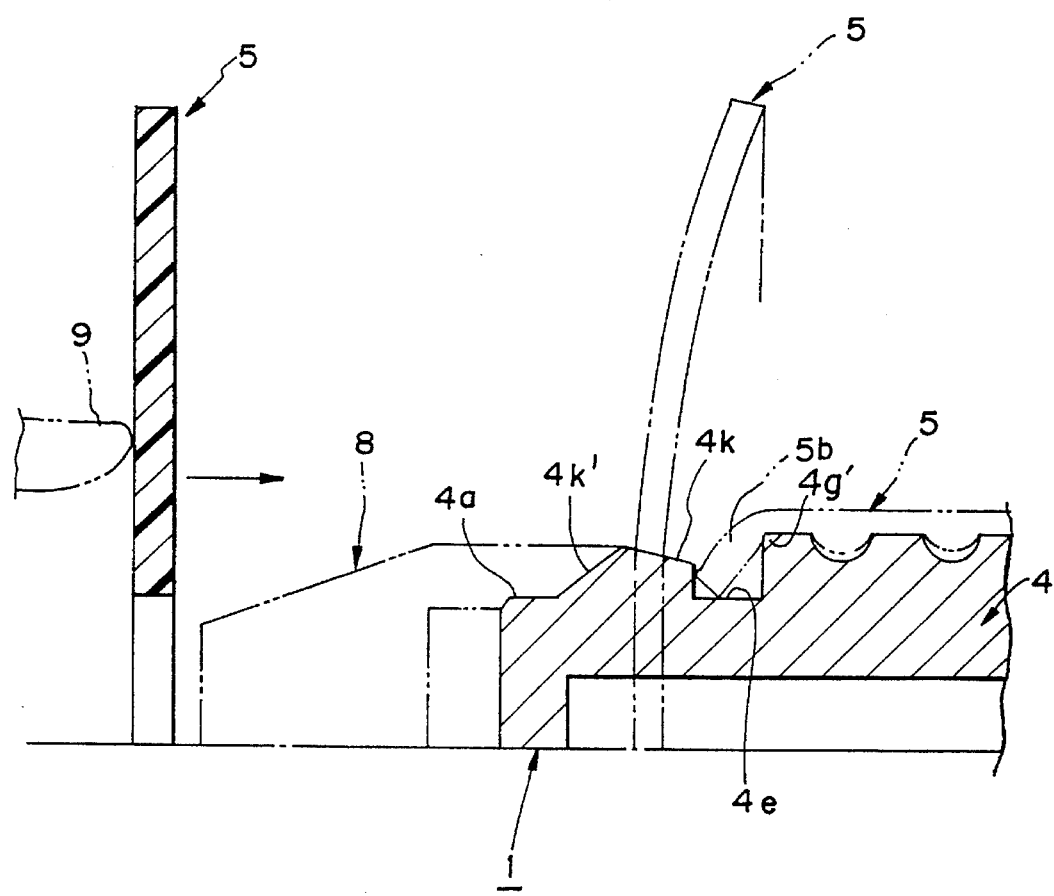
FIG. 2 is a cross section illustrating a process of assembling a piston ring 5 on a piston body 4.

The piston 1 of the present embodiment is constructed in the manner mentioned above, and a process of mounting the piston ring 5 upon the piston body 4 is illustrated in FIG. 2. Referring to this Figure, the piston ring 5 is in the form of a disc having a through-opening in its axial portion before it is mounted on the piston body 4. When a jig 8 is engaged with the end 4a of the piston body 4, a cylindrical pressure member 9 is used to drive the piston ring 5 over the jig so as to be a press fit upon the piston body 4.

Specifically, in the present embodiment, a distal end of the jig 8 is fitted over the left end 4a of the piston body 4 and the second tapered surface 4k', and then the piston ring 5 is moved over the jig 8 from the left to fit its inner periphery around the outer periphery of the jig 8.

Subsequently, the piston ring 5 is gradually driven to the right along the outer peripheral surface of the jig 8 until the inner periphery of the piston ring 5 is fitted upon the first tapered surface 4k of the piston body 4. Since the diameter of the first tapered surface 4k decreases as it progresses to the right, the inner periphery of the piston ring 5 smoothly slides over the first tapered surface 4k to the right, and when freed, is fitted upon the bottom surface 4i, which defines the corner of the first receiving groove 4e, due to its own contraction.

Subsequently, a cylindrical heater member, not shown, is fitted, from the left, over the piston body 4 so that its distal end gradually urges the disc-shaped piston ring 5 to the right. This brings the piston ring 5 into abutment against the contact region 4g', and a portion of the piston ring 5 which is then located radially outward of the contact region 4g' will be gradually confined to lay down to form the bend 5b having its end disposed in abutment against the corner. When it is heated by the heater member, the piston ring 5 is gradually shaped into a cylindrical configuration, and because the inner periphery is pressed against the outer periphery of the piston body 4, a portion of the piston ring 5 which is initially located radially outward of the bend 5b will be completely shaped into a cylindrical configuration. The inner periphery of the piston ring 5, which is rendered viscous as a result of the heating, is tightly held against the outer peripheral surface of the greater diameter portion 4c of the piston body 4 and bites into the individual engaging grooves 4d to form the annular projections In addition, the right end of the piston ring 5 is received in the second receiving groove 4f at its inner periphery.

In this manner, as the heater member presses the piston ring 5 while heating it, the piston ring 5 which was in the form of a disc initially is shaped into a cylindrical configuration to cover substantially the entire region of the greater diameter portion 4c of the piston body 4.

The construction and operation of such a heater member is disclosed in U.S. Pat. No. 3,212,411, and therefore, will not be specifically described. If required, a known technique as disclosed in Japanese Laid-Open Patent Application No. 82,072/1986 or the like may be employed.

As described, in the present embodiment, the second end face 4h which defines the first receiving groove 4e extends in a direction orthogonal to the axis of the piston body 4, and the tip of the bend 5b is disposed in abutment against a corner which is defined by the second end face 4h and the bottom surface 4i. As a result of the abutment of the tip of the bend 5b against the corner, it is unlikely that the tip of the bend 5b be displaced radially outward from the corner thus reducing the possibility that the bend 5b may be disengaged from within the first receiving groove 4e.

Considering this more specifically, the piston 1 slides to the left and right, as viewed in FIG. 1, relative to the cylinder 3 and it will be seen that when the piston 1 moves to the left, the tip of the bend 5b is strongly urged against the corner, thus making it difficult that the bend 5b be disengaged from within the first receiving groove 4e. On the other hand, when the piston 1 moves to the right, the bend 5b, which assumes a conical configuration, tends to become cylindrical, and as a consequence, the bend 5b will be curved into arch-shaped cross section, as indicated by phantom lines in FIG. 1, whereby the tip of the bend 5b will be strongly pressed against the corner and its adjacent bottom surface 4i, again reducing the likelihood that the bend 5b be disengaged from within the first receiving groove 4e. Since the bend 5b is disposed within the first receiving groove 4e at an angle of inclination of approximately 45° and since the contact region 4g' of the piston body 4 is chamfered into an arcuate cross section, the possibility that a portion of the piston ring 5 which contacts the contact region 4g' be damaged can be prevented in a favorable manner.

By contrast, in the receiving groove disclosed in the aforementioned Laid-Open Patent Application, an end face which corresponds to the second end face 4h is a tapered surface, and the bend is formed by folding one end of the piston ring 5, causing the folded tip to be liable to be displaced radially outward along the tapered surface to cause a disengagement of the folded tip from the first receiving groove 4e, as pointed out previously. In addition, in this prior art construction, a region corresponding to the contact region 4g' of the piston body 4 according to the invention is not chamfered, but remains pointed, so that when the piston 1 moves to the right, a concentration of internal stresses occurs at the location of the piston ring 5 which engages the contact region 4g',causing a fracture of the piston ring 5 at that point.

It will be seen that in the present embodiment, the bend 5b is contained within the first receiving groove 4e at an inclination of approximately 45°, and an annular space is formed inside the bend 5b. The presence of such space allows an elastic deformation of the bend 5b in an inward direction. Accordingly, if an oil flowing from the tip of the piston 1 (or the upper left end as viewed in FIG. 1) is accumulated on the outside of the bend 5b disposed within the first receiving groove 4e, the bend 5b will be curved into arch-shaped configuration to reduce its diameter, as indicated by phantom lines. At that time, the tip of the bend 5b will be strongly pressed against the bottom surface 4i, which defines the corner, and at the same time, the starting point for the bending of the bend 5b will be strongly pressed against the contact region 4g' of the piston body 4. Accordingly, if the oil becomes accumulated on the outside of the bend 5b disposed within the first receiving groove 4e as it flows from the end of the piston 1 (upper left side), an ingress of the oil into the space between the inner peripheral surface of the bend 5b and the first receiving groove 4e, and hence a leakage of the oil to the right through a clearance between the inner peripheral surface of the piston ring 5 and the outer peripheral surface of the piston body 4, can be prevented. In this event, if the pressure of the oil which is accumulated on the outside of the bend 5b rises to a higher value, the portion of the piston ring 5 which moves into contact with the contact region 4g' of the piston body 4 will bulge radially outward to be strongly pressed against the cylinder 3, as indicated by phantom lines, whereby the inner peripheral surface of such bulging portion will be strongly pressed back against the contact region 4g'. In this manner, a leakage of the oil can be prevented in a favorable manner if the oil pressure rises high.

In the event the oil finds its way into the space disposed inside the bend 5b from the right-hand side through any clearance between the piston ring 5 and the piston body 4, the pressure which is produced by the oil accumulating inside the bend 5b causes the tip of the bend 5b to be strongly pressed against the second end face, whereby a further leakage of the oil to the left beyond this point can be prevented.

In addition, in the present embodiment, the provision of the first tapered surface 4k which is located to the left of and continues from the first receiving groove 4e allows a smooth movement of the inner periphery of the piston ring 5 along the first tapered surface 4k when mounting the piston ring 5 upon the piston body 4 by utilizing the jig 8. In this manner, an operation to mount the piston ring 5 into the first receiving groove 4e can be facilitated.

In the embodiment, the bend 5b has a thickness of 0.9 mm, which is slightly greater than the thickness, 0.6 mm, of the connection 4c which is located to the right thereof and connecting adjacent engaging grooves 4d together. However, the thickness of the bend 5b may be chosen to a greater value on the order of twice the thickness of the connection 5c. When so constructed, the rigidity of the bend 5b can be increased, further reducing the possibility that the bend 5b may be disengaged from the first receiving groove 4e.

While it has been described that the material for the piston ring 5 comprises a synthetic resin principally comprising tetrafluoride resin, any other suitable synthetic resin may be chosen.

In the described embodiment, the first receiving groove 4e has a depth and a width, which are substantially equal to each other, whereby the bend 5b is disposed at an angle of inclination of approximately 45° with respect to the axis of the piston body 4. However, the invention is not limited to such choice. In accordance with the invention, the bend 5b may be disposed at an angle of inclination from 20° to 60°, or preferably, from 30° to 50°, with respect to the axis of the piston body 4. When a greater angle of inclination is chosen for the bend 5b, a crack is likely to occur in the bend. On the other hand, if a smaller angle of inclination is chosen for the bend 5b, the bend 5b is more likely to be disengaged from the first receiving groove 4e.

As discussed, the present invention provides an advantageous effect that a disengagement of a bend of the piston ring from the receiving groove is more unlikely to occur as compared with the prior art.

What is claimed is:

1. A piston of a shock absorber comprising a cylindrical piston body defining a longitudinal axis thereof, and a piston ring formed of a resin and covering an outer peripheral surface of the piston body, the piston ring having an inner periphery which is disposed about the outer peripheral surface of the piston body and includes a bent portion at one end thereof and an annular projection, the outer periphery of the piston body being formed with an engaging groove at a predetermined axial position, which is engaged by the annular projection formed on the inner periphery of the piston ring, and a receiving groove at one end thereof in which the bent portion formed at one end of the piston ring is received;

comprising the improvement wherein the receiving groove comprises a first end face disposed nearest the engaging groove, a second end face disposed in opposing relationship with the first end face and extending in a direction orthogonal to the longitudinal axis of the piston body, and a bottom surface which extends between the first end face and the second end face, the second end face and the bottom surface defining a corner therebetween, the bent portion of the piston ring having a tip portion thereof and being received in the receiving groove with the tip portion of the bent portion being disposed in abutment against the corner defined by the second end face and the bottom surface.

2. The piston according to claim 1 in which the piston ring is formed of a synthetic resin principally comprising tetrafluoride resin, the piston ring being in the form of a disc prior to covering the piston body and being deformed into a cylindrical configuration so as to cover the piston body.

3. The piston according to claim 1 in which the bent portion is disposed at an angle of inclination of from 20° to 60° with respect to the longitudinal axis of the piston body.

4. The piston according to claim 1 in which the bent portion is disposed at an angle of inclination of from 20° to 50° with respect to the longitudinal axis of the piston body.

5. The piston according to claim 1 in which the receiving groove has a depth which is greater than a depth of the engaging groove while the receiving groove has a width which is substantially equal to the depth of the receiving groove.

6. The piston according to claim 1 in which the bent portion has a thickness which is greater than a thickness of a median portion of the piston ring.

7. The piston according to claim 1 in which the piston body has an outer periphery at an end adjacent to the receiving groove which is formed as a tapered surface having a diameter which reduces toward the receiving groove.

8. The piston according to claim 1 wherein the bent portion tapers radially inwardly from the outer peripheral surface proximate the first end face to the corner within the receiving groove, the bent portion defining an annular space disposed between the inner periphery thereof and the bottom surface and the first end face of the receiving groove.

9. The piston ring according to claim 1 wherein said first end face is extended in a direction orthogonal to the longitudinal axis and parallel to said second end face.

10. A piston of a shock absorber comprising a cylindrical piston body defining a longitudinal axis thereof, and a piston ring formed of a resin and covering an outer peripheral surface of the piston body, the piston ring having an inner periphery which is disposed about the outer peripheral surface of the piston body and includes a bent portion at one end thereof and an annular projection, the outer periphery of the piston body being formed with an engaging groove at a predetermined axial position, which is engaged by the annular projection formed on the inner periphery of the piston ring, and a receiving groove at one end thereof in which the bent portion formed at one end of the piston ring is received;

comprising the improvement wherein the receiving groove comprises a first end face which is disposed nearest the engaging groove and extends in a direction orthogonal to the longitudinal axis of the piston body, a second end face which is disposed in opposing relationship with the first end face and extends in a direction orthogonal to the longitudinal axis of the piston body, and a bottom surface which extends between the first end face and the second end face, the second end face and the bottom surface defining a corner therebetween, the bent portion of the piston ring having a tip portion thereof and being received in the receiving groove with the tip portion of the bent portion being disposed in abutment against the corner defined by the second end face and the bottom surface, the bent portion tapering radially inwardly from the outer peripheral surface proximate the first end face to the corner within the receiving groove an annular space being defined between the inner periphery of the bent portion and the bottom surface and the first end face of the receiving groove.

* * * * *

UNITED STATES PATENT AND TRADEMARK OFFICE
CERTIFICATE OF CORRECTION

PATENT NO. : 5,520,092
DATED : May 28, 1996
INVENTOR(S) : Masatake IIDA et al

It is certified that error appears in the above-indentified patent and that said Letters Patent is hereby corrected as shown below:

Column 6, line 33; change "20°" to ---30°---.

Signed and Sealed this

Twenty-first Day of January, 1997

Attest:

BRUCE LEHMAN

Attesting Officer  Commissioner of Patents and Trademarks